(12) United States Patent
Henderkott et al.

(10) Patent No.: US 11,090,771 B2
(45) Date of Patent: Aug. 17, 2021

(54) DUAL-WALLED COMPONENTS FOR A GAS TURBINE ENGINE

(71) Applicant: Rolls-Royce Corporation, Indianapolis, IN (US)

(72) Inventors: Joseph Peter Henderkott, Westfield, IN (US); Robert Frederick Proctor, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 154 days.

(21) Appl. No.: 16/181,035

(22) Filed: Nov. 5, 2018

(65) Prior Publication Data
US 2020/0139493 A1 May 7, 2020

(51) Int. Cl.
*B23P 15/02* (2006.01)
*F01D 5/18* (2006.01)
(Continued)

(52) U.S. Cl.
CPC ............. *B23P 15/02* (2013.01); *B23P 17/04* (2013.01); *B23P 23/04* (2013.01); *F01D 5/187* (2013.01);
(Continued)

(58) Field of Classification Search
CPC .......... B23P 15/02; B23P 17/04; B23P 23/04; B23P 1/002; B23P 26/0624;
(Continued)

(56) References Cited

U.S. PATENT DOCUMENTS 3,390,986 A 7/1968 Stenerson
4,209,348 A 6/1980 Duhl et al.
(Continued)

FOREIGN PATENT DOCUMENTS

CN 105091030 A 11/2015
DE 102005059299 A1 6/2006
(Continued)

OTHER PUBLICATIONS

Pollock, et al., "Nickel-Based Superalloys for Advanced Turbine Engines: Chemistry, Microstructure, and Properties," Journal of Propulsion and Power, vol. 22, No. 2, Mar.-Apr. 2006, pp. 361-374.
(Continued)

*Primary Examiner* — Sarang Afzali
*Assistant Examiner* — Darrell C Ford
(74) *Attorney, Agent, or Firm* — Shumaker & Sieffert, P.A.

(57) ABSTRACT

An assembly for a dual-walled component of a gas turbine engine and methods of forming and repairing a dual-walled component. The assembly includes a cold section part having an outer surface that defines a plurality of impingement apertures, a hot section part including a pre-sintered preform, the hot section part positioned over the outer surface of the cold section part, and a plurality of support structures including the pre-sintered preform, the plurality of support structures positioned between the hot section part and the cold section part, the plurality of support structures separating the hot section part from the cold section part to define at least one cooling channel therebetween.

7 Claims, 8 Drawing Sheets

(51) Int. Cl.
*B23P 17/04* (2006.01)
*B23P 23/04* (2006.01)
*F01D 25/12* (2006.01)

(52) U.S. Cl.
CPC .......... *F01D 25/12* (2013.01); *F05D 2230/22* (2013.01)

(58) Field of Classification Search
CPC ............ B23P 2101/001; B23P 35/0244; B23P 1/0018; F01D 5/187; F01D 25/12; F01D 5/186; F05D 2230/22; F05D 2240/12; F05D 2240/35; F05D 2260/201; F05D 2260/202; F05D 2260/221; C22C 19/07; C22C 19/056; B23K 1/002; B23K 26/0624; B23K 2101/001; B23K 35/0244; B23K 1/0018; Y10T 29/49826; Y10T 29/49885; Y10T 29/49904; Y10T 29/4998; Y10T 29/49982; Y10T 29/4932; Y10T 29/49336; Y10T 29/49339; Y10T 29/49341
USPC ........ 29/428, 527.1, 527.2, 458, 469, 889.2, 29/889.7, 889.72, 889.721
See application file for complete search history.

(56) References Cited

U.S. PATENT DOCUMENTS

| | | | |
|---|---|---|---|
| 4,611,752 A | 9/1986 | Jahnke | |
| 4,614,296 A | 9/1986 | Lesgourgues | |
| 4,940,566 A | 7/1990 | Wood et al. | |
| 5,017,753 A | 5/1991 | Deckard | |
| 5,332,360 A | 7/1994 | Correia et al. | |
| 5,381,944 A | 1/1995 | Makowiecki et al. | |
| 5,395,584 A | 3/1995 | Berger et al. | |
| 5,474,227 A | 12/1995 | Krengel et al. | |
| 5,732,468 A | 3/1998 | Galley et al. | |
| 5,797,725 A | 8/1998 | Rhodes | |
| 5,902,498 A | 5/1999 | Mistry et al. | |
| 6,003,754 A | 12/1999 | Rhodes | |
| 6,172,327 B1 | 1/2001 | Aleshin et al. | |
| 6,195,864 B1 | 3/2001 | Chesnes | |
| 6,199,746 B1 | 3/2001 | Dupree et al. | |
| 6,213,714 B1 | 4/2001 | Rhodes | |
| 6,214,248 B1 | 4/2001 | Browning | |
| 6,325,871 B1 | 12/2001 | Burke et al. | |
| 6,454,885 B1 | 9/2002 | Chesnes et al. | |
| 6,575,702 B2 | 6/2003 | Jackson et al. | |
| 6,579,061 B1 | 6/2003 | Heyward et al. | |
| 6,797,914 B2 | 9/2004 | Speranza et al. | |
| 6,837,417 B2 | 1/2005 | Srinivasan | |
| 6,951,112 B2 | 10/2005 | Czachor | |
| 7,051,435 B1 | 5/2006 | Subramanian et al. | |
| 7,080,971 B2 | 7/2006 | Wilson | |
| 7,146,725 B2 | 12/2006 | Kottilingam et al. | |
| 7,343,676 B2 | 3/2008 | Ng | |
| 7,484,928 B2 | 2/2009 | Arness et al. | |
| 7,506,793 B2 | 3/2009 | Sathian | |
| 7,653,994 B2 | 2/2010 | Dasilva et al. | |
| 7,731,809 B2 | 6/2010 | Hu | |
| 7,761,989 B2 | 7/2010 | Lutz et al. | |
| 7,845,549 B2 | 12/2010 | Budinger | |
| 7,966,707 B2 | 6/2011 | Szela et al. | |
| 7,975,902 B2 | 7/2011 | Wilden et al. | |
| 8,070,450 B1 | 12/2011 | Ryznic | |
| 8,087,565 B2 | 1/2012 | Kottilingam et al. | |
| 8,247,733 B2 | 8/2012 | Zhu | |
| 8,356,409 B2 | 1/2013 | Perret | |
| 8,449,249 B2 | 5/2013 | Suchezky | |
| 8,528,208 B2 | 9/2013 | Rebak | |
| 8,539,659 B2 | 9/2013 | Szela et al. | |
| 8,555,500 B2 | 10/2013 | Vossberg et al. | |
| 8,590,158 B2 * | 11/2013 | Gallagher | B01D 53/22 29/896.62 |
| 8,685,314 B2 | 4/2014 | Tuppen et al. | |
| 8,703,044 B2 | 4/2014 | Sathian et al. | |
| 8,739,404 B2 | 6/2014 | Bunker et al. | |
| 8,875,392 B2 | 11/2014 | Richter | |
| 9,003,657 B2 | 4/2015 | Bunker et al. | |
| 9,085,980 B2 | 7/2015 | Mittendorf et al. | |
| 9,174,312 B2 | 11/2015 | Baughman et al. | |
| 9,228,958 B2 | 1/2016 | Shirkhodaie et al. | |
| 9,476,306 B2 | 10/2016 | Bunker | |
| 9,751,147 B2 | 9/2017 | Rhodes et al. | |
| 9,810,069 B2 | 11/2017 | Dubs et al. | |
| 9,863,249 B2 | 1/2018 | Shinn et al. | |
| 10,076,811 B2 | 9/2018 | Ozbaysal | |
| 2002/0157737 A1 | 10/2002 | Chesnes et al. | |
| 2003/0026697 A1 | 2/2003 | Subramanian et al. | |
| 2004/0086635 A1 | 5/2004 | Grossklaus, Jr. et al. | |
| 2005/0067061 A1 | 3/2005 | Huang et al. | |
| 2005/0217110 A1 | 10/2005 | Topal | |
| 2007/0044306 A1 | 3/2007 | Szela et al. | |
| 2007/0154338 A1 | 7/2007 | Sathian et al. | |
| 2007/0163684 A1 | 7/2007 | Hu | |
| 2007/0284410 A1 | 12/2007 | Budinger | |
| 2008/0011813 A1 | 1/2008 | Bucci et al. | |
| 2009/0026182 A1 | 1/2009 | Hu et al. | |
| 2009/0255116 A1 | 10/2009 | McMasters et al. | |
| 2010/0059573 A1 | 3/2010 | Kottilingam et al. | |
| 2010/0257733 A1 | 10/2010 | Guo et al. | |
| 2011/0185739 A1 | 8/2011 | Bronson et al. | |
| 2012/0231295 A1 | 9/2012 | Kottilingam et al. | |
| 2012/0308843 A1 | 12/2012 | Ott et al. | |
| 2014/0154082 A1 | 6/2014 | Shinn et al. | |
| 2014/0302278 A1 | 10/2014 | Bunker | |
| 2014/0369741 A1 | 12/2014 | Cui et al. | |
| 2015/0090773 A1* | 4/2015 | Schick | B23K 1/00 228/165 |
| 2015/0224607 A1* | 8/2015 | Bruck | B23K 25/005 219/73.21 |
| 2015/0367456 A1 | 12/2015 | Ozbaysal et al. | |
| 2016/0151829 A1* | 6/2016 | Propheter-Hinckley | F01D 5/284 164/529 |
| 2016/0177749 A1 | 6/2016 | Brandl et al. | |
| 2016/0230576 A1 | 8/2016 | Freeman et al. | |
| 2016/0230993 A1* | 8/2016 | Dai | F01D 5/186 |
| 2016/0250725 A1 | 9/2016 | Henderkott et al. | |
| 2016/0251965 A1* | 9/2016 | Henderkott | B23K 1/0018 60/752 |
| 2016/0339544 A1* | 11/2016 | Xu | C22C 1/0433 |
| 2016/0375461 A1 | 12/2016 | Taylor | |
| 2017/0252870 A1 | 9/2017 | Cui et al. | |
| 2018/0031226 A1 | 2/2018 | Burchill et al. | |
| 2018/0073390 A1 | 3/2018 | Varney | |
| 2018/0073396 A1 | 3/2018 | Varney | |
| 2018/0093354 A1 | 4/2018 | Cui | |
| 2018/0313226 A1 | 11/2018 | Henderson et al. | |

FOREIGN PATENT DOCUMENTS

| | | |
|---|---|---|
| DE | 102014226055 A1 | 6/2016 |
| EP | 1503144 A1 | 2/2005 |
| EP | 1528322 A2 | 5/2005 |
| EP | 1803521 A1 | 7/2007 |
| EP | 1880793 A2 | 1/2008 |
| EP | 1884306 A1 | 2/2008 |
| EP | 2078579 A1 | 7/2009 |
| EP | 2206575 A1 | 7/2010 |
| EP | 2578720 A2 | 4/2013 |
| EP | 2713007 A1 | 4/2014 |
| EP | 3095550 A1 | 11/2016 |
| WO | 98/45491 A1 | 10/1998 |
| WO | 2012092279 A1 | 7/2012 |
| WO | 2014/143963 A1 | 9/2014 |

(56) References Cited

FOREIGN PATENT DOCUMENTS

| WO | 2015147929 A2 | 10/2015 |
| WO | 2016096382 A1 | 6/2016 |

OTHER PUBLICATIONS

U.S. Appl. No. 16/272,664, filed Feb. 11, 2019 by Raymond Ruiwen Xu et al.

\* cited by examiner

DUAL-WALLED COMPONENTS FOR A GAS TURBINE ENGINE

TECHNICAL FIELD

The present disclosure relates to coversheets and spars for forming a dual-walled component of a gas turbine engine.

BACKGROUND

Hot section components of a gas turbine engine may be operated in high temperature environments that may approach or exceed the softening or melting points of the materials of the components. Such components may include air foils including, for example turbine blades or foils which may have one or more surfaces exposed to high temperature combustion or exhaust gases flowing across the surface of the competent. Different techniques have been developed to assist with cooling of such components including for example, application of a thermal barrier coating to the component, constructing the component as a single or dual-walled structure, and passing a cooling fluid, such as air, across or through a portion of the component to aid in cooling of the component.

SUMMARY

In some examples, the disclosure describes an assembly for a dual-walled component of a gas turbine engine. The assembly includes a cold section part having an outer surface that defines a plurality of impingement apertures, a hot section part including a pre-sintered preform, the hot section part positioned over the outer surface of the cold section part, and a plurality of support structures including the pre-sintered preform, the plurality of support structures positioned between the hot section part and the cold section part, the plurality of support structures separating the hot section part from the cold section part to define at least one cooling channel therebetween.

In some examples, the disclosure describes a method for forming a dual-walled component for a gas turbine engine. The method includes forming a cold section part including an outer surface that defines a plurality of impingement apertures, forming a hot section part including a pre-sintered preform, forming a plurality of support structures including the pre-sintered preform; positioning the hot section part over the outer surface of the cold section part such that the plurality of support structures separate the hot section part from the cold section part to define at least one cooling channel therebetween, and heating the hot section part to sinter the pre-sintered preform and bond the hot section part to the cold section part via the plurality of support structures.

In some examples, the disclosure describes a method for repairing a dual-walled component for a gas turbine engine. The method includes removing a damaged section of the dual-walled component, where the dual walled component includes a cold section part, a hot section part, and a plurality of support structures positioned between and separating the hot section part and the cold section part to define at least one cooling channel therebetween, and where removing the damaged section of the dual-walled component includes removing a portion of the hot section part and the plurality of support structures to expose an outer surface of the cold section component to define a repair volume within the dual-walled component. The method also includes forming a repair patch configured to replace the removed damaged section of the dual-walled component, the repair patch includes a replacement hot section part and a plurality of replacement support structures, where the plurality of replacement support structures are formed along a side of the of the replacement hot section part, and where the repair patch includes a pre-sintered preform. The method also includes positioning the repair patch within the repair volume with the plurality of replacement support structures positioned against the outer surface of the cold section component and heating the repair patch to sinter the pre-sintered preform and bond the repair patch to the dual-walled component.

The details of one or more examples are set forth in the accompanying drawings and the description below. Other features, objects, and advantages will be apparent from the description and drawings, and from the claims.

DETAILED DESCRIPTION

In general, the disclosure describes techniques for forming or repairing hot section, dual-walled components, such as dual-walled components for a gas turbine engine, that includes using a pre-sintered preform to construct at least a portion of the dual-walled component. Hot section components, such as a flame tube or combustor liner of a combustor and air foils of a gas turbine engine may be operated in high temperature gaseous environments. In some such examples, the temperature of the gaseous environments may approach or exceed the operational parameters for the respective components. Indeed, in some instances, operating temperatures in a high-pressure turbine section of a gas turbine engine may exceed melting or softening points of the superalloy materials used to form such components. In some examples, to reduce or substantially eliminate the risk of melting the engine components, the component may include a dual-walled structure that includes cooling channels and cooling apertures within the dual-walled structure. Such cooling systems may function by flowing relatively cold air from the compressor section of the gas turbine engine through the cooling channels of the dual-walled structure. These channels may exhaust some or all of the cooling air through cooling apertures in the surfaces of the outer wall of the dual-walled component. In some examples, the exhausted cooling air may protect the dual-walled component in such high temperature gaseous environments by, for example, reducing the relative temperature of the component, creating a film of cooling air passing over the surface of the component exposed to the high temperature environment, reducing the temperature of the gas within the high temperature environment, or a combination of two or more of these effects.

In some examples, the dual-walled component may be formed by bonding multiple parts of a component (e.g., a coversheet, spar, and/or support structures of an airfoil) together. The disclosed examples and techniques described herein may be used to improve the manufacturing efficiencies for the creation of such components or the repair of such components if damaged during operation.

Figure 1:
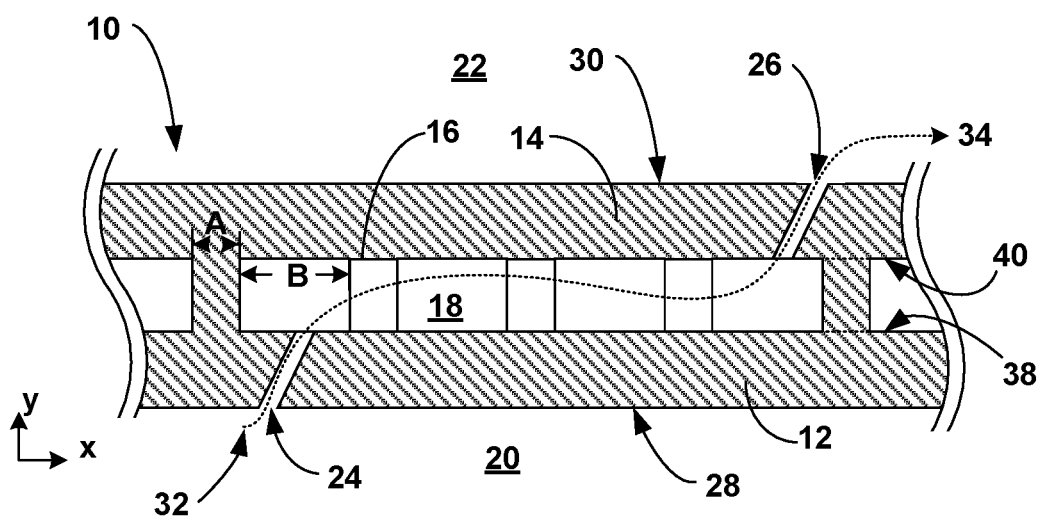
FIG. 1 is conceptual cross-sectional view of an example dual-walled component.

FIG. 1 is conceptual cross-sectional view of an example dual-walled component 10, such as a dual-walled component for a gas turbine engine. Dual-walled component 10 includes a cold section part 12, a hot section part 14, and a plurality of support structures 16 that separate cold section part 12 from hot section part 14. Dual-walled component 10 may be configured to separate a cooling air plenum 20 from a heated gas environment 22 such that dual-walled component 10 acts as a physical divider between the two mediums. The terms "hot section part" and "cold section part" are used merely to orient which part is positioned adjacent to cooling air plenum 20 and which part is positioned adjacent to heated gas environment 22 and is not intended to limit the relative temperatures of the different environments or parts. For example, while cold section part 12 and cooling air plenum 20 may be described herein as "cold" sections compared to hot section part 14 and heated gas environment 22, the respective temperatures of cold section part 12 or cooling air plenum 20 may reach relatively high temperatures between about 1400° F. to about 2400° F. (e.g., about 760° C. to about 1300° C.) during routine operation, but may remain comparatively cool compared to the temperatures within heated gas environment 22.

In some examples, dual-walled component 10 may be a part for the hot-section of a gas turbine engine (e.g., combustor, turbine, or exhaust sections) that receives or transfers cooling air as part of cooling system for a gas turbine engine. Dual-walled component 10 may include, for example, a component of a combustor such as a flame tube, combustion ring, combustor liner, an inner or outer casing, a guide vane, or the like; a component of a turbine section such as a nozzle guide vane, a turbine disc, a turbine blade or vane, or the like; or another component associated with the hot section (e.g., a combustor or a high, low, or intermediate pressure turbine) of a gas turbine engine.

Within dual-walled component 10, cold section part 12 and hot section part 14 may be separated by a plurality of support structures 16 which are used to define one or more cooling channels 18 between cold section part 12 and hot section part 14 amongst support structures 16. In some examples, cold section part 12 includes a plurality of impingement apertures 24 extending through the thickness of cold section part 12 extending between cooling air plenum 20 and the one or more cooling channels 18. Similarly, in some examples, hot section part 14 may include a plurality of cooling apertures 26 in surface 30 of hot section part 14 that extend between one or more cooling channels 18 and heated gas environment 22. During operation of dual-walled component 10, cooling air 32 from cooling air plenum 20 may pass through impingement apertures 24 entering and flowing through one or more cooling channels 18 prior to passing through cooling apertures 26 into heated gas environment 22.

During operation, cooling air 32 may assist in maintaining the temperature of dual-walled component 10 at a level lower than that of heated gas environment 22. For example, the temperature of the air within cooling air plenum 20 may be less than that of hot gas environment 22. Cooling air 32 may flow through impingement apertures 24 and impinge on the internal surface of hot section part 14, resulting in heat transfer from hot section part 14 to cooling air 32. Additional heat may be transferred from hot section part 14 and plurality of support structures 16 as cooling air 32 flows through one or more cooling channels 18. Further, cooling air 32 may exit cooling apertures 26 and enter heated gas environment 22, creating a thermally insulating film of relatively cool gas along surface 30 of dual-walled component 10 that allows surface 30 of dual-walled component 10 to remain at a temperature less than that of the bulk temperature of heated gas environment 22. In some examples, cooling air 32 may also at least partially mix with the gas of heated gas environment 22, thereby reducing the relative temperature of heated gas environment 22.

The presence of cooling channels 18 may create a zoned temperature gradient between the respective regions of cooling air plenum 20, cooling channels 18, and heated gas environment 22. Thus, dual-walled component 10 and the presence of cooling channels 18 may allow for more efficient cooling of the component compared to a comparable single-walled component.

In some examples, cooling air 32 may act as a cooling reservoir that absorbs heat from portions of dual-walled component 10 as the air passes through one or more of cooling channels 18, impingement apertures 24, cooling apertures 26, or along one or more of the surfaces of dual-walled component 10, thereby dissipating the heat of dual-walled component 10 and allowing the relative temperature of dual-walled component 10 to be maintained at a temperature less than that of heated gas environment 22. In some examples, maintaining the temperature of dual-walled component 10 within a range less than that of heated gas environment 22 may increase the engine efficiency.

Cooling air plenum 20 and heated gas environment 22 may represent different flow paths, chambers, or regions within the gas turbine engine in which dual-walled component 10 is installed. For example, in some examples where dual-walled component 10 is a flame tube of a combustor of a gas turbine engine, heated gas environment 22 may include the combustion chamber within the flame tube and cooling air plenum may include the by-pass/cooling air that surrounds the exterior of the flame tube. In some examples in which dual-walled component 10 is a turbine blade or vane, heated gas environment 22 may include the environment external to and flowing past the turbine blade or vane while cooling air plenum 20 may include one or more interior chambers within the turbine blade or vane representing part of the integral cooling system of the gas turbine engine. In such examples, cold section part 12 may represent the spar of an airfoil (e.g., blade or vane) and hot section part 14 may represent one or more of the coversheets being bonded to the spar.

In some examples, cooling air 32 may be supplied to dual-walled component 10 (e.g., via cooling air plenum 20) at a pressure greater than the gas path pressure within heated gas environment 22. The pressure differential between cooling air plenum 12 and heated gas environment 22 may force cooling air 32 through one or more of the flow paths established by cooling channels 18, impingement apertures 24, and cooling apertures 26 (collectively flow paths 34).

To define cooling channels 18, plurality of support structures 16 may take on any useful configuration, size, shape, or pattern. In some examples, the height of plurality of support structures 16 may be between about 0.2 mm and about 2 mm to define the height of cooling channels 18. In some examples, plurality of support structures 16 may include a plurality of columns, spires, pedestals, or the like which are used to separate cold section part 12 from hot section part 14 and creating a network of cooling channels 18 there between. In some examples, plurality of support structures 16 may also include one or more dams that act as zone dividers between adjacent cooling channels 18, thereby separating one cooling channel 18 from another between cold section part 12 from hot section part 14. The introduction of dams within dual-walled component 10 may assist with maintaining a more uniform temperature across surface 30 of hot section part 14. In some examples, the pattern of cooling channels 18 may resemble a grid, wave, serpentine, swirl, or the like. Example patterns and arrangements of cooling channels are disclosed and described in U.S. Pat. No. 6,213,714 issued Apr. 10, 2001 entitled COOLED AIRFOIL, which is incorporated by reference in its entirety. In some examples, one or both of hot section part 14 and cold section part 12 may be formed to define a layer thickness (e.g., in the y-axis direction of FIG. 1) of about 0.014 inches to about 0.300 inches (e.g., about 0.36 mm to about 7.62 mm).

Plurality of impingement apertures 24 and cooling apertures 26 (collectively, "apertures 24, 26") may be formed may be formed using any suitable technique including, for example, mechanical drilling, laser ablation (e.g., picosecond or femtosecond pulsed lasers), electro-chemical machining, or the like. In some examples, apertures 24, 26 may be introduced within respective hot or cold section parts at an angle to the surface of the part (e.g., an offset angle compared to the normal of a respective surface). In some examples, apertures 24, 26 may define an angle of incidence of about 10 degrees to about 75 degrees (i.e., with 90 degrees representing the perpendicular/normal to a respective surface). In some examples, one or more of cooling apertures 26 may include a fanned Coanda ramp path at the point of exit from the surface of hot section part 14 to assist in the distribution or film characteristics of the cooling air as it exits the respective cooling apertures 26. In some examples, the diameter of apertures 24, 26 may be less than about 0.01 inches to about 0.12 inches in diameter (e.g., about 0.25 millimeters (mm) to about 3 mm).

In some examples, dual-walled component 10 may be formed using an adaptive machining process where cold section part 12 and hot section part 14 are formed by, for example, a casting process in which the respective parts are independently formed of compatible superalloy metals. In such examples, support structures 16 may be integrally cast as part of the casting process of cold section part 12. Once casted, a separate machining process may be implemented to tailor a specific cold section part 12, including support structures 16, to a pair with a specific hot section part 14 (or vice versa) followed by brazing or diffusion bonding the two parts together.

Due to the structural complexity of the bonding surfaces between cold section part 12 and hot section part 14 (e.g., the bonding surface established between support structures 16 and hot section part 14) the respective parts may require extensive and complex machining to establish an appropriate bond surface between a specific cold section part 12 and a specific hot section part 14. For example, a digital model of a cold section part (e.g., a spar) including its support structures may be constructed to determine the dimensional variations of the bond surfaces of the support structures compared to a theoretical standard. The bond surface of a hot section component (e.g., a coversheet) can similarly be mapped and compared to determine which support structures, and to what extent are outside of tolerance limits. An adaptive machining process may then be determined an implemented to machine specific bond surfaces of the support sutures to ensure all bond surfaces are brought within tolerance limits. Such component-specific machining may be costly, time consuming, and inefficient for producing dual-walled components or airfoils on a large scale. Additionally, such components become expensive to replace should any damage occur to the component during routine operation.

The manufacturing techniques disclosed herein may be used to reduce the expense, time, and inefficiencies in forming such dual-walled components. Additionally, or alternatively, the manufacturing techniques disclosed herein may be used to repair damaged sections of previously formed dual-walled components thereby reducing the need for a full replacement of the component.

For example, as described herein, dual-walled component 10 may be constructed from an assembly that includes one or more portions of hot section part 14, cold section part 12, support structures 16, or combinations thereof being formed of a pre-sintered preform (PSP) material that, through subsequent heat processing, may be fully sintered to bond the parts of the assembly together and produce dual-walled component 10. The PSP material may offer better workability and ductility compared to an otherwise fully sintered superalloy material, such as those formed using the casting techniques described above. The PSP material may define a complex three-dimensional shape configured to retain its shape independent of molds or other support materials.

Additionally, or alternatively, forming portions of dual-walled component 10 using a PSP material combined with the subsequent assembly techniques described herein may offer reduced operating costs and waste compared to the fabrication and assembly techniques used to produce dual-walled components from superalloy materials. For example, the fabrication of the PSP materials into one or more of the desired components (e.g., hot section part 14, support segments 16, or cold section part 12) may reduce cost of manufacture due to lower defect levels in the fabrication process, facilitate more complex geometry, or the like. In some examples, one or more of cold section part 12 or hot section part 14 may be formed or machined to a nominal size (e.g., machined to a set standard of specifications) and the respective parts may be bonded together through completion of the sintering process of the PSP material, thereby allowing the parts to be used interchangeably rather than needing to being machined to part specific specifications (e.g., serial number pairing of a hot section part to a cold section part).

The PSP materials described herein may include a mixture of high-melt (e.g., high melting point) metal alloy particles, such as particulates of a superalloy metal, combined with particles of a low-melt (e.g., low melting point) braze material that have been partially sintered together to form the PSP material. The low-melt braze material may act as an interim binder holding the multiple phase regions of the high-melt metal alloy together to help give the PSP shape and structural stability. The mixture of the high-melt metal alloy particles and low-melt braze material may be characterized as a homogeneous mixture in that the particles or phase regions of the high-melt and low-melt materials are evenly distributed throughout the PSP material to provide a substantially uniform composition.

During subsequent heat processing at elevated temperatures, the low-melt braze material having a comparatively lower melting point than the high-melt metal alloy, may soften and/or melt allowing the low-melt braze material to diffuse into both the phase regions of the high-melt metal alloy and the surrounding components (e.g., cold section part 12) to sinter the PSP material into a resulting superalloy metal and bond cold section part 12, plurality of support structures 16 and hot section part 14 together, thereby forming dual-walled component 10.

In some examples, the PSP materials described herein may include distinct phase regions (e.g., particulates, particles, grains or the like) of a high-melt metal alloy (e.g., superalloy metal) and distinct phase regions of a low-melt braze material. In some examples, the high-melt metal alloy may include any suitable metal alloy including, but not limited to, nickel-based alloy, cobalt-based alloy, iron-based alloy, or the like. In some examples, the high-melt metal alloy of the PSP material may be a superalloy metal (e.g., Ni-, Co-, Fe-based superalloy). Any useful superalloy may be utilized including, for example, Ni-based superalloys such as those available from Martin-Marietta Corp., Bethesda, Md., under the trade designation MAR-M246, MAR-M247 or Ni-based superalloys available from Cannon-Muskegon Corp., Muskegon, Mich., under the trade designations CMSX-3, CMSX-4, CMSX-10, and CM-186; Co-based superalloys such as those available from Martin-Marietta Corp., Bethesda, Md., under the trade designation MAR-M509; Fe-based superalloys; and the like. Representative compositions of CMSX-3 and CMSX-4 are shown below in Table 1.

TABLE 1

|    | CMSX-3 (wt. %) | CMSX-4 (wt. %) |
|----|----------------|----------------|
| Cr | 8              | 6.5            |
| Al | 5.6            | 5.6            |
| Ti | 1              | 1              |
| Co | 5              | 10             |
| W  | 8              | 6              |
| Mo | 0.6            | 0.6            |
| Ta | 6              | 6              |
| Hf | 0.1            | 0.1            |
| Re | —              | 3              |
| Ni | Balance        | Balance        |

In some examples, the high-melt metal alloy of the PSP material may include particles having a composition of about 50 wt. % to about 70 wt. % Ni, about 2 wt. % to about 10 wt. % Cr, about 2 wt. % to about 10 wt. % Ta, about 5 wt. % to about 15 wt. % Co, about 2 wt. % to about 10 wt. % Al, about 2 wt. % to about 10 wt. % W, about 2 wt. % to about 4 wt. % Re, up to about 3 wt. % Mo, and up to about 3 wt. % Hf. In some examples, the composition of the high-melt metal alloy also may include up to about 1 wt. % each of at least one of Ti, Nb, C, B, Si, or Zr. In some examples, the composition of the high-melt metal alloy may include about 55 wt. % to about 60 wt. % Ni, about 7 wt. % Cr, about 6 wt. % Ta, about 12 wt. % Co, about 6 wt. % Al, about 3 wt. % Re, about 1.5 wt. % Hf, and about 5 wt. % W.

In contrast to the low-melt braze material, the high-melt metal alloy includes an alloy, or a mixture of alloys, that remains substantially unmelted at the braze temperatures used to complete the sintering process of the PSP material. The composition the high-melt metal alloy within the PSP has a melting temperature above the braze temperature (hence the name "high-melt"). The low-melt braze material may have a composition that includes an alloy or a mixture of alloys that melt at a temperature below about 1232° C. (about 2250° F.), with the alloy or mixture of alloys being selected so that the low-melt braze material as a whole substantially melts at a temperature between about 1093° C. (about 2000° F.) and about 1260° C. (about 2300° F.). In contrast, the high-melt metal alloy may have a composition that includes a single high-melt alloy or a mixture of alloys that melt at a temperature of greater than about 1315° C. (about 2400° F.).

In some examples, the low-melt braze material may include one or more nickel-based or cobalt-based alloys. In some examples, the low-melt braze material may include particulates that include between about 50 wt. % and about 70 wt. % Ni, between about 8 wt. % and about 20 wt. % Cr, between about 8 wt. % and about 15 wt. % Ta, between about 4 wt. % and about 10 wt. % Co, between about 2 wt. % and about 7 wt. % Al, up to about 2.25 wt. % B, and up to about 2.25 wt. % Si, and has a compositional melting range of between about 1093° C. (about 2000° F.) and about 1260° C. (about 2300° F.). In some examples, the low-melt braze material may also include up to about 1 wt. % each of at least one of Ti, W, Mo, Re, Nb, Hf, Pd, Pt, Ir, Ru, C, Si, P, Fe, Ce, La, Y, or Zr.

In some examples the low-melt braze material comprises a mixture of two or more low-melt alloys. For example, a low-melt braze material may include particles of (a) about 35% of a first low-melt material including about 74 wt. % Ni, about 6 wt. % Cr, about 6 wt. % Al, about 12 wt. % Co, and about 2 wt. % B, with a liquidus temperature of about 1121° C. (about 2050° F.); (b) about 45% of a second low-melt material including about 42 wt. % Ni, about 31 wt. % Cr, about 26 wt. % Ta, and about 1 wt. % B, with a liquidus temperature of about 1232° C. (about 2250° F.); and (c) about 20 wt. % of a third low-melt material including about 64 wt. % Ni, about 6 wt. % Al, about 8 wt. % Co, about 4 wt. % W, about 4 wt. % Ta, about 3 wt. % Si, about 1 wt. % Re, about 1 wt. % Nb, and about 1 wt. % B, with a liquidus temperature of about 1093° C. (about 2000° F.).

The low-melt braze material and the high-melt metal alloy may each be combined initially in particulate form. For example, the PSP material may be formed by homogenously mixing (e.g., mechanically mixing) particles of the high-melt metal alloy and low-melt braze material with an optional binder in a selected composition and depositing the mixture into a mold of a desired shape (e.g., a mold of hot section part 14). Next, the mixture may be partially sintered via heating the mixture at a temperature above the softening or melting point of the low-melt braze material and preferably below the melting temperature of the high-melt metal alloy. The sintering temperature and the duration of the initial sintering may depend at least in part on the composition of the initial mixture of high-melt and low-melt materials.

In some examples, the resultant PSP material may be cut or machined into a predetermined shape or form after being formed. In some examples, the resultant component of PSP material may include a complex geometry, e.g., multiple planes or surfaces, simple or complex curves, overhangs, undercuts, protrusions, or the like depending upon the desired geometry of dual-walled component 10 and which part or portion of dual walled component 10 is being formed from the PSP material.

In some examples, the initial mixture of the low-melt braze material and the high-melt metal alloy may have specific powder mesh sizes, and may be produced by induction melting the low-melt braze material or the high-melt metal alloy, respectively, in vacuum or an argon atmosphere, followed by argon gas atomization. Each individual powder component used in PSP material may be analyzed to confirm the particle size and chemical compositions.

The low-melt braze material and high-melt metal alloy of the PSP may be combined in any selected ratio. In some examples, the initial mixture used to form the PSP material may include a powder mixture including or consisting essentially of about 20 wt. % to about 80 wt. % of the low-melt braze material and a balance of the high-melt metal alloy (a ratio of between about 1:4 and about 4:1 low-melt:high-melt material ratio). In some cases, the low-melt braze material may be a mixture of more than one braze alloy particulates. In some examples, the ratio of the low-melt braze material to the high-melt metal alloy may be between about 1:3 and about 3:1, such as a ratio between about 1:2 and about 2:1 low-melt:high-melt material, or a ratio between about 1:1 and about 1:1.5 low-melt:high-melt material. For example, The PSP material may include about 40 wt. % to about 50 wt. % low-melt braze material and about 50 wt. % to about 60 wt. % high-melt metal alloy, such as about 45 wt. % low-melt braze material and about 55 wt. % high-melt metal alloy.

Hence, in some examples, the PSP material may include about 50 wt. % to about 90 wt. % Ni, up to about 15 wt. % Cr, up to about 10 wt. % Ta, up to about 10 wt. % Co, up to about 7 wt. % Al, up to about 4 wt. % W, up to about 2 wt. % Re, up to about 1 wt. % Mo, up to about 1 wt. % Hf, and, optionally, up to about 0.5 wt. % Nb, up to about 3 wt. % Si, and up to about 3 wt. % B. In some examples, the PSP material may include between about 50 wt. % and about 70 wt. % Ni, between about 10 wt. % and about 15 wt. Cr, between about 8 wt. % and about 10 wt. % Ta, between about 8 wt. % and about 10 wt. % Co, between about 4 wt. % and about 7 wt. % Al, between about 2 wt. % and about 4 wt. % W, between about 1 wt. % and about 2 wt. % Re, about 1 wt. % Mo, about 1 wt. % Hf, and, optionally, up to about 1% each at least one of Ti, Nb, Pd, Pt, Ir, Ru, C, B, Si, P, Mn, Fe, Ce, La, Y, or Zr. In some examples, the PSP material may include about 50 wt. % to about 70 wt. % Ni, about 10 wt. % to about 15 wt. % Cr, about 8 wt. % to about 10 wt. % Ta, about 8 wt. % to about 10 wt. % Co, about 4 wt. % to about 7 wt. % Al, about 2 wt. % to about 4 wt. % W, about 1 wt. % to about 2 wt. % Re, about 0.5 wt. % to about 1 wt. % Mo, about 0.5 wt. % to about 1 wt. % Hf, about 0.1 wt. % to about 0.5 wt. % Nb, about 0.05 wt. % to about 3 wt. % Si, and about 0.5 wt. % to about 2 wt. % B. In some examples, the PSP material may include about 58 wt. % Ni, about 11 wt. % Cr, about 9 wt. % Ta, about 9 wt. % Co, about 5 wt. % Al, about 3 wt. % W, about 1 wt. % Mo, about 1 wt. % Re, and about 1 wt. % Hf; or may include about 10.2 wt. % to about 11.3 wt. % Cr, about 4.8 wt. % to about 5.1 wt. % Al, about 9.1 wt. % to about 9.8 wt. % Co, about 2.8 wt. % to about 3.3 wt. % W, about 0.7 wt. % to about 0.9 wt. % Mo, about 8.2 wt. % to about 8.8 wt. % Ta, about 0.6 wt. % to about 0.8 wt. % B, about 0.3 wt. % Si, about 1.5 wt. % to about 1.8 wt. % Re, about 0.8 wt. % to about 0.9 wt. % Hf, about 0.1 wt. % to about 0.2 wt. % Nb, and a balance Ni.

In selecting the proportions of components used in the PSP material, higher weight percentages of the high-melt metal alloy may provide better mechanical properties in view of their reduced levels of boron, silicon, or both. Conversely, higher percentages of the low-melt braze material may provide improved flow (e.g., of the low-melt braze material) at the joint region. A proper balance between mechanical properties and material flow should be selected.

In some examples, a PSP material that includes higher Al content may possess improved high-temperature oxidation resistance properties compared to a PSP material with lower Al content. Further, increasing Ta content in a PSP material may improve mechanical properties at or near the resultant joint region compared to lower Ta content. In particular, Ta may strengthen the gamma NiAl and gamma prime $Ni_3Al$ phases by increasing lattice mismatches.

Figure 2:
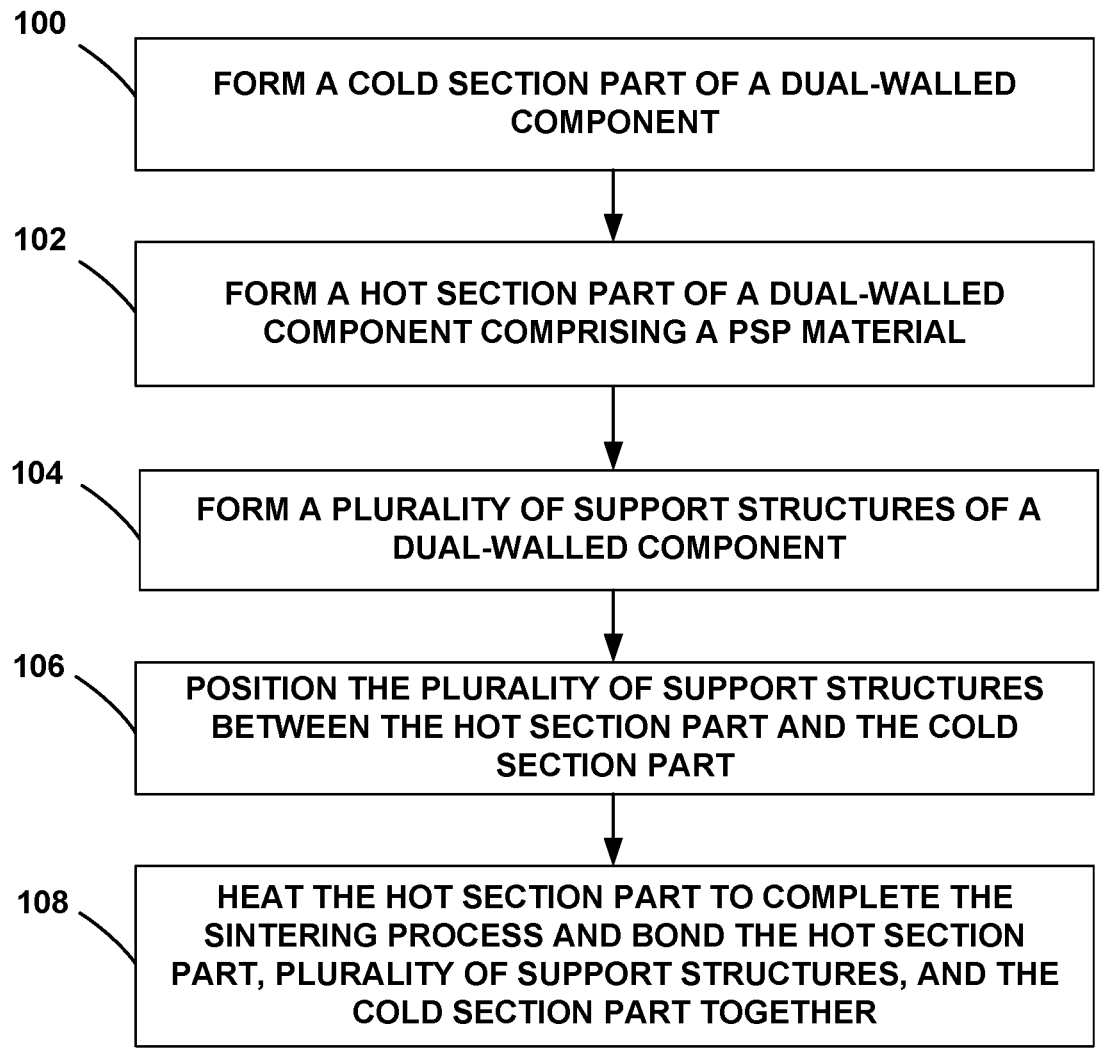
FIG. 2 is a flow diagram illustrating an example technique for forming the dual-walled component of FIG. 1 using a pre-sintered preform material consistent with the techniques described herein.

FIG. 2 is a flow diagram illustrating an example technique for forming a dual-walled component 10 using a PSP material consistent with the techniques described herein. The technique of FIG. 2 will be described with reference to dual-walled component 10 of FIG. 1 and the example assembly 200 of FIGS. 3A-3C for purposes of illustration only. It will be appreciated that the technique of FIG. 2 may be performed with a different assembly, or that assembly 200 or dual-walled component 10 may be used or formed in a different or modified technique than that described by FIG. 2.

The technique of FIG. 2 includes forming a cold section part 12 for a dual-walled component 10 (100); forming a hot section part 14 including a PSP material for dual-walled component 10 (102); forming a plurality of support structures 16 for dual-walled component 10 (104); positioning plurality of support structures between hot section part 14 and cold section part 12 (106); and heating hot section part 14 to an elevated temperature to complete the sintering process, causing plurality of support structures 16, hot section part 14, and cold section part 12 to become bonded together (108).

Cold section part 12 for a dual-walled component 10 may be formed (100) using any suitable technique. In some examples, cold section part 12 may be formed using a hot-melt casting technique in which the underlying alloy material (e.g., a superalloy metal such as Ni-, Co-, or Fe-based superalloys) used to form cold section part 12 is heated to a molten state and cast into a mold defining the desired shape for cold section part 12 (e.g., a the shape of a spar component). In some examples, after being formed, one or more impingement apertures 24 may be introduced along cold section part 12 to provide passage of cooling air 32 through the part from cooling air plenum 20 to surface 38. In other examples, cold section part 12 may be formed of a PSP material using a mold casting technique. In either example, one or more surfaces of cold section part 12 may be machined or cleaned after cold section part 12 is formed.

The technique of FIG. 2 also includes forming hot section part 14 (102). As described above hot section part 14 may be formed from a PSP material. For example, particles of a high-melt metal alloy (e.g., a superalloy metal) may be mixed with particles of a low-melt braze material along with any other additive materials or temporary binders. The materials may be combined as an un-sintered clay composite that is molded (e.g., using a mandrel or mold) into a desired shape. The mixture may be heated to partially sinter some of the high-melt metal alloy and low-melt braze material to form a PSP material in the shape of hot section part 14. The PSP material may be further machined or cleaned prior to being joined with cold section part 12.

The technique of FIG. 2 also includes forming plurality of support structures 16 (104). Support structures 16 may be formed integrally (e.g., formed as a single-piece of material) with hot section part 14, formed integrally with cold section part 12, formed as a structure independent of hot section part 14 and cold section part 12, or a combination thereof. In examples where plurality of support structures 16 are formed integrally with cold section part 12, support structures 16 may be formed as part of the casting process (e.g., integrally cast) such that plurality of support structures 16 and cold section part 12 are formed as a single, integral cast part (e.g., a spar) with plurality of support structures 16 each protruding from outer surface 38 of cold section part 12. For example, support structures 16 may be incorporated into the design of the mold used during the hot-melt casting process such that support structures 16 are individually defined as part of the casting process. In some such examples, both the cold section part 12 and the plurality of support structures 16 may be composed of a PSP material or may be composed of a superalloy metal formed via a conventional mold casting process. Alternatively, support structures 16 may be formed post-casting of cold section part 12 via a suitable machining or etching technique. In either case, cold section part 12 and support structures 16 may be subsequently processed to clean or shape the exterior surface of the resultant component into a desired shape.

In other examples, plurality of support structures 16 are formed (104) integrally with hot section part 14 as part of the forming hot section part 14 (102). For example, support structures 16 may be formed integrally with hot section part 14 as part of the formation process of hot section part 14 such that support structures 16 and hot section part 14 are formed as a single-piece, integral part (e.g., a coversheet) with plurality of support structures 16 each protruding from inner surface 40 of hot section part 14. In such examples, both support structures 16 and hot section part 14 may be formed of a PSP material. In some examples, support structures 16 may incorporated into the design of the mold or mandrel used to form hot section part 14. Alternatively, support structures 16 may be formed post-PSP formation by machining or etching a surface of the resultant PSP material to define both hot section part 14 and support structures 16. In either case, hot section part 14 and support structures 16 may be subsequently processed to clean or shape the surfaces of the resultant part.

Figure 3A:
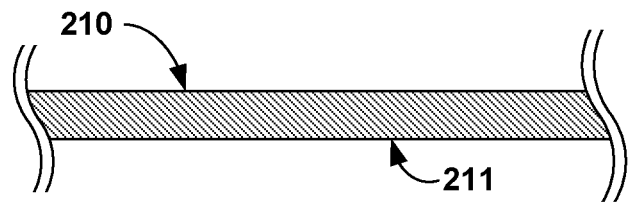
FIGS. 3A, 3B, and 3C are each a schematic cross-sectional view collectively illustrating an example build process used to produce an assembly for forming the dual-walled component of FIG. 1 using the techniques described herein.
Figure 3B:
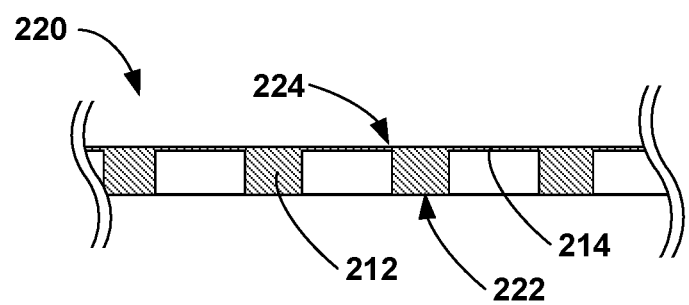
Figure 3C:
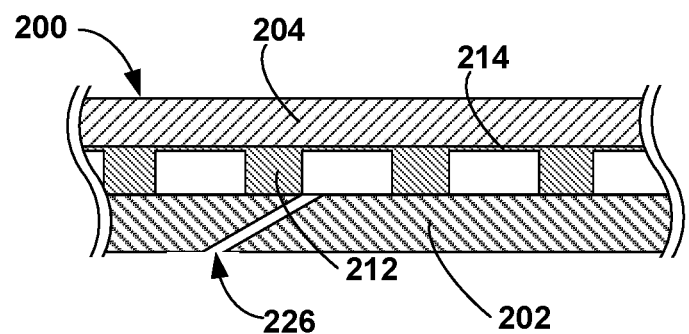

In yet other examples, plurality of support structures 16 are formed (104) independent of both hot section part 14 and cold section part 12. In some such examples, plurality of support structures 16 may be formed out of a standalone layer of PSP material. For example, FIGS. 3A-3B are schematic cross-sectional views of an example build process used to produce an assembly 200 for forming dual-walled component 10 using the techniques described herein. Assembly 200 includes a cold section part 202, a hot section part 204, and a support layer 220 that includes a plurality of support structures 212. Cold section part 202 and hot section part 204 may be substantially similar the precursor components of cold section part 12 and hot section part 14 described above with respect to FIG. 2 apart from any differences described below and may be formed using the techniques described above. With respect to support layer 220, it will be understood that while support layer 220 represents a structure independent of either cold section part 202 or hot section part 204. Plurality of support structures 212 defined therein may be substantially similar in terms of size, spacing, and function to plurality of support structures 16 described above apart from any differences described below.

The build process of assembly 200 includes forming support layer 220. In some examples, support layer 220 may be fabricated from a single layer 210 of PSP material formed into a desired shape (FIG. 3A). Plurality of support structures 212 may then be formed by machining or etching layer 210 to define the individual support structures 212 (FIG. 3B). In examples of etching, a chemical etching process may be performed by applying a masking material (not shown) to a bonding surface 211 of single layer 210. The masking material may define a desired cooling channel pattern and organization for support structures 212 along surface 211. The masking material may be suitably selected to prevent chemical etching of the corresponding surfaces of layer 210 that are covered by the masking material and allow for removal of the masking material once the etching process is complete. Suitable materials for the masking material may include, for example, photoresist materials. Any suitable etchant may be used to chemically etch layer 210, which may include, for example, an aqueous solution including nitric acid, acetic acid, hydrochloric acid and/or other acids or dopants to modify the control and rate for the etching process.

In some examples, layer 210 may be etched or machined such that only support structures 212 remain, arranged in a two-dimensional patterned arrangement. In other examples, layer 210 may be processed such that support structures 212 are all connected by a relatively thin base layer 214 of the PSP material along a common side opposite the etched or machined side. The support structures 212 may be connected to base layer 214 in a desired two-dimensional patterned arrangement. In both examples, the resultant structure of plurality of support structures 212 and base layer 214 (if present) is referred to herein as support layer 220.

In some examples, having base layer 214 remain as part of support layer 220 may make subsequent processing and handling of support layer 220 easier because all of support structures 212 will be connected to a single structure rather than individually formed. Further, base layer 214 may help to maintain a desired separation distance between plurality of support structures 212 as well as permit a high degree of ductility for support layer 220. During subsequent heat processing, base layer 214 may be sintered and bonded to either hot section part 204 or cold section part 202.

Once plurality of support structures 212 are formed either as part of support layer 220 or as part of cold section part 12 or hot section part 14, the components of the assembly (e.g., assembly 200) may be arranged with plurality of support structures 16, 212 being positioned between cold section part 12, 202 and hot section part 14, 204 (106). In examples where the resultant assembly includes support layer 220 that includes base layer 214, base layer 214 may be set adjacent to either cold section part 202 or hot section part 204. In some examples, base layer 214 may be set adjacent to hot section part 204, as opposed to cold section part 202, so as not to interfere with any impingement apertures 226 that may be present on cold section part 202.

The various bonding surfaces between plurality of support structures 16, 212, cold section part 12, 202, and hot section part 14, 204 may be positioned either in direct contact with the respective bonding surfaces of adjacent components or may be positioned with a temporary adhesive disposed therebetween. The temporary adhesive may be fugitive material and function as a processing aid to temporarily hold one more of plurality of support structures 16, 212, hot section part 14, 204, or cold section part 12, 202 in relative position to another respective component. During subsequent processing to bond the various parts together, the temporary adhesive may thermally decompose such that the adhesive does not form part or serve a role in the final dual-walled component being created. In some examples, at least one of the bonding surfaces (e.g., the surface to be bonded to either the hot section part or cold section part) of at least one of plurality of support structures 16, 212 may include the temporary adhesive. Additionally, or alternatively, in examples where the assembly includes support layer 220, the temporary adhesive may be applied to the bonding surface 222 of at least one of plurality of support structures 212, at least a portion of the bonding surface 224 of base layer 214, or both.

With plurality of support structures 16, 212 positioned between cold section part 12, 202 and hot section part 14, 204, at least hot section part 14, 204 may be heated to an elevated temperature to complete the sintering process, causing plurality of support structures 16, 212, hot section part 14, 204, and cold section part 12, 202 to become bonded together (108) and produce a dual-walled component 10 comprising a superalloy material. During the heating process, the PSP material (e.g., the PSP material of hot section part 14, 204) may be heated to a temperature above the softening or melting point of the low-melt braze material and below the melting point of the high-melt braze material to complete the brazing process. In some examples, during the heating process, the entire assembly of the support structures 16, 212, hot section part 14, 204, and cold section part 12, 202 may be placed into a furnace or autoclave and collectively heated to a temperature above the softening point of the low-melt braze material and below the softening point of the high-melt metal alloy to complete the sintering process. Example techniques and apparatuses used for performing bonding of dual-walled components which may be used or adapted for use in bonding cold section part 12, 202, plurality of support structures 16, 212, and hot section part 14, 204 are described in U.S. patent application Ser. No. 15/184,235 filed Jun. 16, 2016 entitled AUTOMATED COATING APPLICATION, and U.S. patent application Ser. No. 14/727,593 filed Jun. 1, 2015 entitled FIXTURE FOR HIGH TEMPERATURE JOINING, both of which are incorporated by reference in their entirety.

Once fully bonded via heating at least hot section part 14, 204 to complete the sintering process, cooling apertures (e.g., cooling apertures 26 as shown in FIG. 1) may be formed along hot section part 14, 204 that extend through the thickness of both hot section part 14, 204 and base layer 214 (if present).

Figure 4:
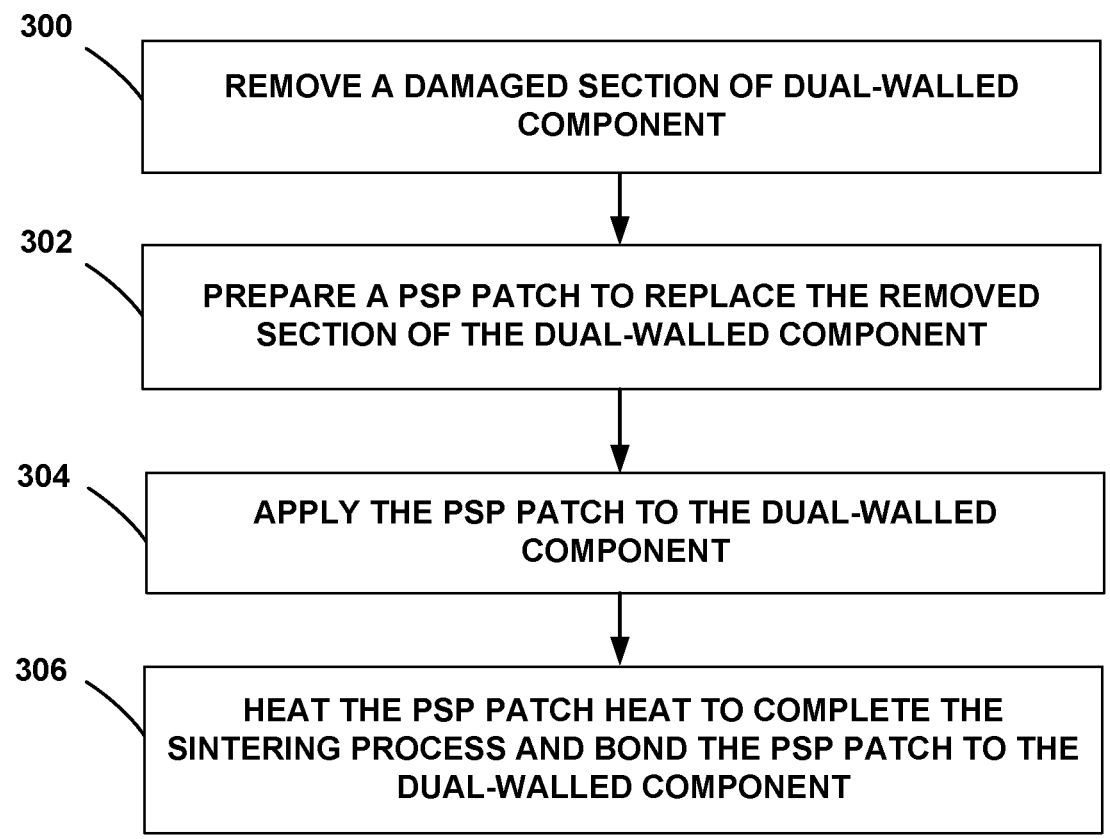
FIG. 4 is flow diagram illustrating an example technique for repairing the dual-walled component of FIG. 5A using a pre-sintered preform material consistent with the techniques described herein.

In some examples, rather than being used to manufacture a new dual-walled component, PSP braze materials may be used to repair a damaged dual-walled component. FIG. 4 is a flow diagram illustrating an example technique for repairing a dual-walled component (e.g., dual-walled component 10) using a PSP material consistent with the techniques described herein. The technique of FIG. 4 will be described with reference to dual-walled component 400 of FIGS. 5A-7C for purposes of illustration only. It will be appreciated that the technique of FIG. 4 may be performed with a different dual-walled component, or that dual walled component 400 may be used in a different or modified repair technique.

Figure 5A:
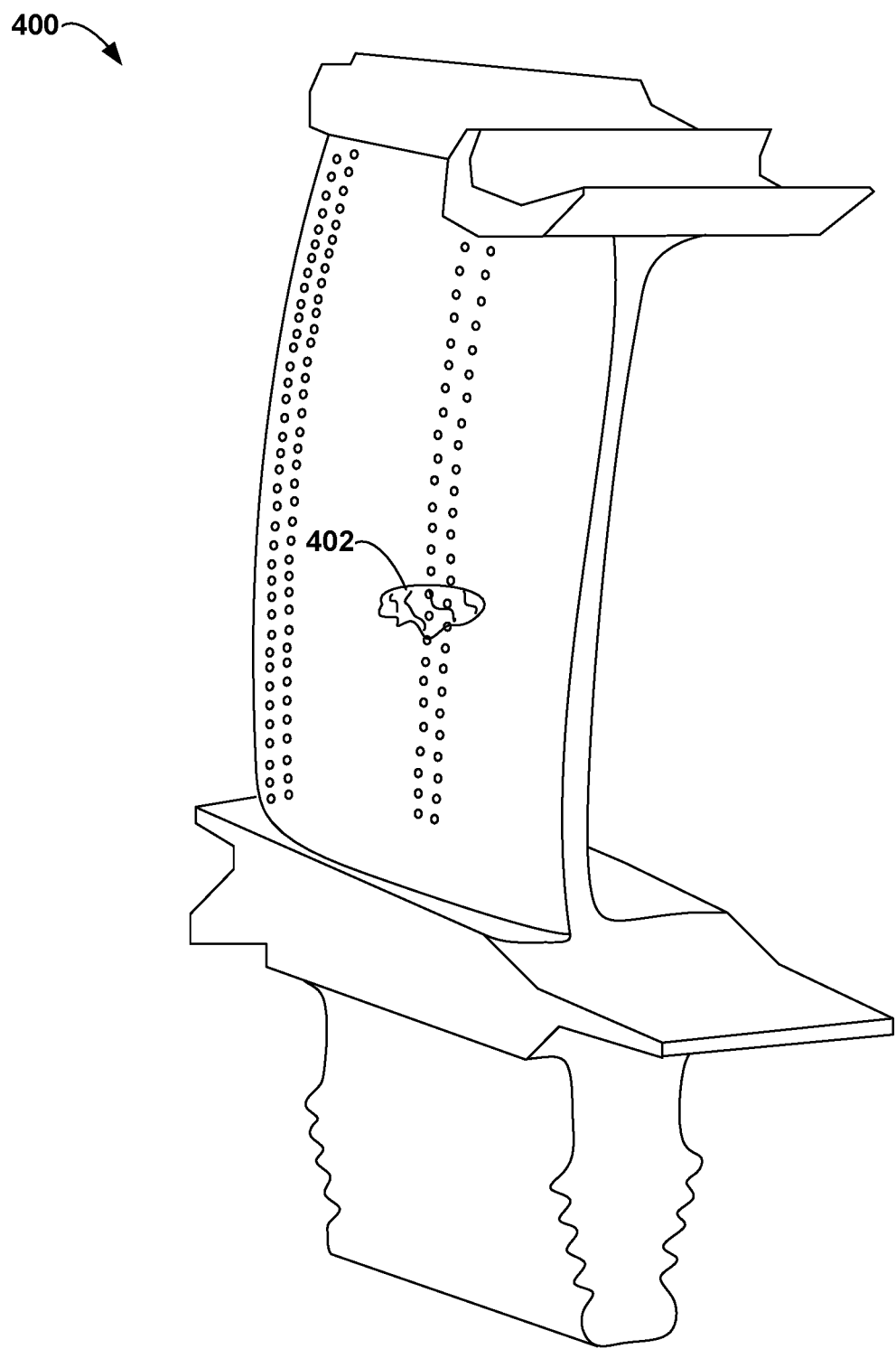
FIGS. 5A, 5B, and 5C are each a schematic view collectively illustrating an example dual-walled component that includes a damaged section.
Figure 5B:
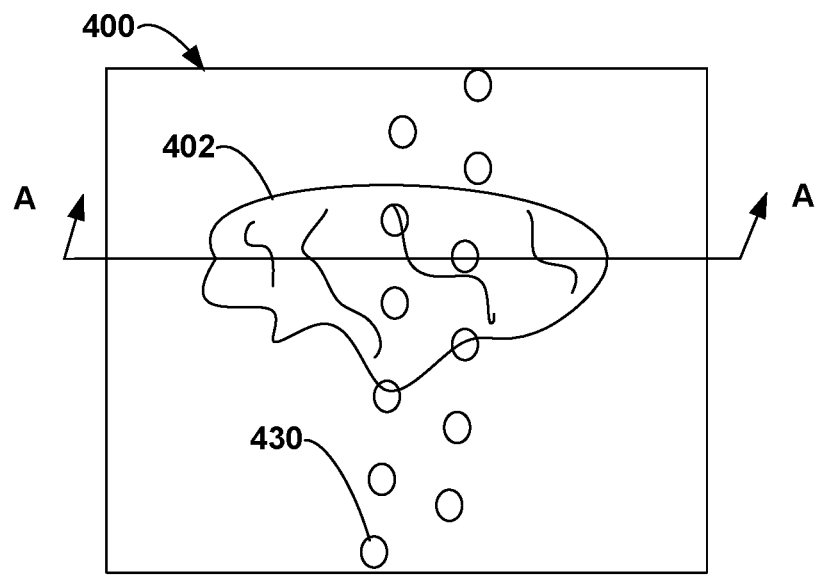
Figure 5C:
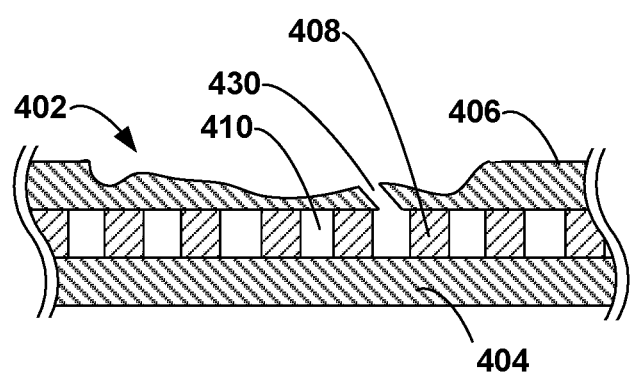
Figure 6A:
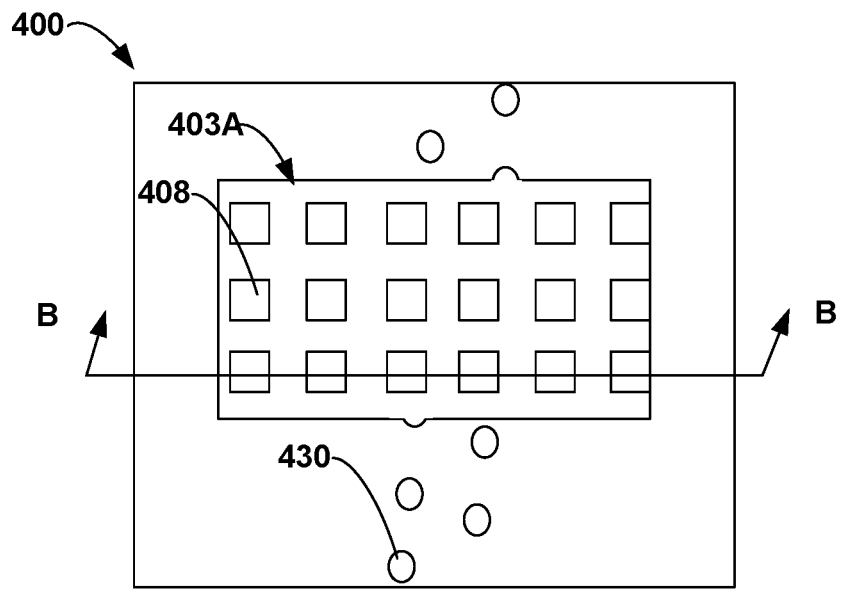
FIGS. 6A, 6B, and 6C, and FIGS. 7A, 7B, and 7C, are each a schematic view collectively illustrating the damaged area of the dual-walled component of FIG. 5A and different examples of how the techniques of FIG. 4 may be used to repair the damaged section.
Figure 6B:
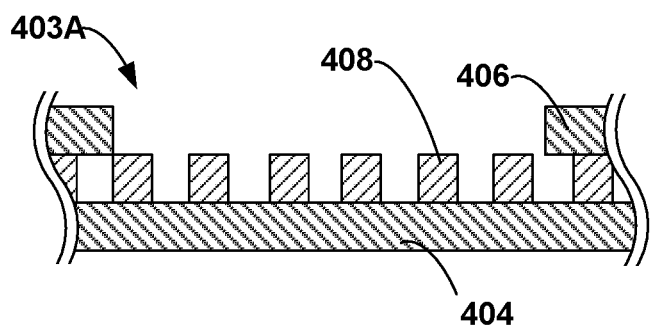
Figure 6C:
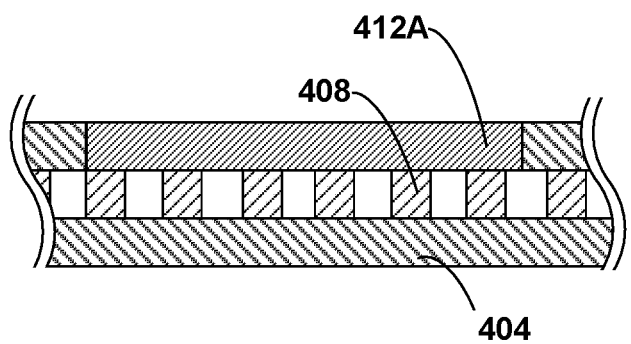

FIGS. 5A-5C are various schematic views of an example dual-walled component 400 (e.g., airfoil blade) that includes a damaged section 402. FIG. 5A is a perspective view while FIG. 5B provides a close-up view of damaged section 402. FIG. 5C is a cross-sectional view of damaged section 402 taken through line A-A of FIG. 5B. Dual-walled component 400 includes a cold section part 404 (e.g., a spar), a hot section part 406 (e.g., a coversheet), and a plurality of support structures 408 positioned therebetween and separating cold section part 404 from hot section part 406 to form a plurality of cooling channels 410. Dual-walled component 400, including plurality of support structures 408, cold section part 404, and hot section part 406, may be substantially similar to the respective components of dual-walled component 10 of FIG. 1 apart from any differences described below. While the damage associated with damaged section 402 is shown as only extending through hot section part 406, in other examples the damage may also extend into plurality of support structures 408 and/or cold section part 404. FIGS. 6A-6C and 7A-7C are schematic views of damaged area 402 similar to FIGS. 5B and 5C that illustrate different examples of how the techniques of FIG. 4 may be used to repair damaged section 402, each of which is described in further detail below. FIG. 6B is a cross-sectional view of FIG. 6A taken through line B-B and FIG. 7B is a cross-sectional view of FIG. 7A taken through line C-C.

The technique of FIG. 4 includes removing a damaged section 402 of dual-walled component 400 (300); preparing a PSP patch 412A or 412B configured to replace the removed section of dual-walled component 400 (302); apply PSP patch 412A or 412B to dual-walled component 400 (304); and heat PSP patch 412A or 412B to complete the sintering process and bond PSP patch 412A or 412B to dual-walled component 400 (306).

In some examples, damaged section 402 of dual-walled component 400 may occur during normal operation of the component. For example, the damage may occur due to impact with debris or other materials passed through the combustion cycle. The damage to damaged section 402 may also occur due to scorching, spallation, chemical degradation, or the like of dual-walled component 400. In other examples, damaged section 402 may occur during the manufacture of dual-walled component 400. For example, damaged section 402 may represent a non-compliant section of dual-walled component 400 due to improper machining, poor bonding, non-compliant thicknesses, or the like.

The technique of FIG. 4 may optionally involve inspecting dual-walled component 400 to identify damaged section 402. In some examples, damaged section 402 may be visually apparent and identified during manual inspection of dual-walled component 400. Additionally, or alternatively, damaged section 402 may be identified using a non-destructive visual inspection algorithm. Example techniques and apparatuses used for identifying damaged or otherwise non-compliant regions of a component are described in, for example, U.S. Pat. No. 9,228,958 issued Jan. 5, 2016 entitled PROTOCOL-BASED INSPECTION SYSTEM, which is incorporated by reference in its entirety.

With damaged section 402 identified, the section may be removed (300) to define a repair volume 403A or 403B (e.g., the volume of dual-walled component 400 removed to be repaired and replaced). In some examples, the identified portions of dual-walled component 400 may be removed by machining (e.g., CNC machining), grit blatting, laser cutting, or other suitable technique. As shown in FIGS. 6A-6C repair volume 403A may remove only a portion of the relevant hot section part 406 leaving support structures 408 otherwise intact. In such examples, corresponding PSP patch 412A may be planar (e.g., flat planed or curved plane to match the curved outer surface of dual walled component 400) having relatively smooth inner and outer major surfaces that do not include the presence of any support structures.

Figure 7A:
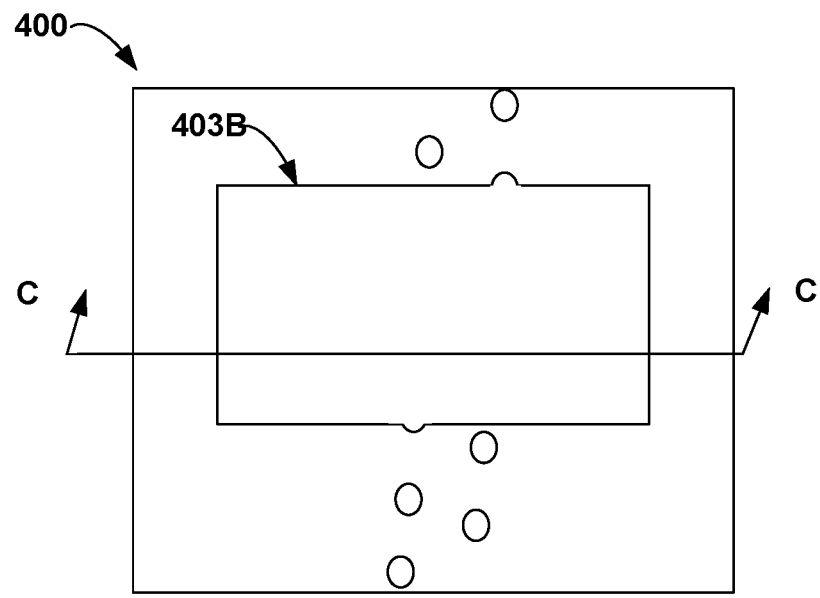
Figure 7B:
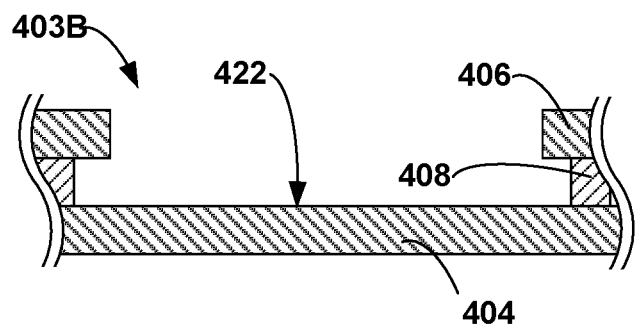
Figure 7C:
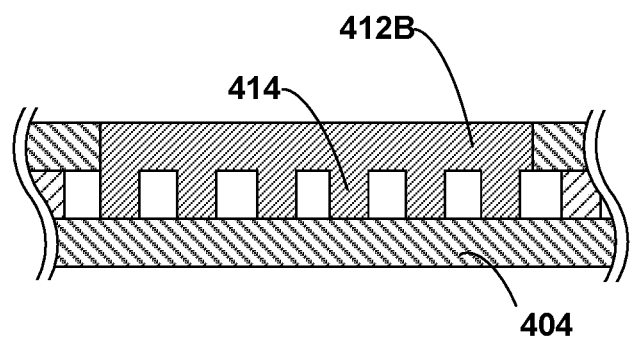

In other examples, repair volume 403B may remove both hot section part 406 and portions of support structures 408 within the identified damaged section 402 to expose a surface 422 of cold section part 404 (FIGS. 7A-7C). In such examples, corresponding PSP patch 412B may include a plurality of replacement support structures 414 positioned along an inner surface of the patch to replace plurality of support structures 408 being removed. Alternatively, PSP patch 412B may be formed in two parts including a planar segment similar to PSP patch 412A of FIG. 6C and a support layer segment composed of a plurality of support structures 414 and formed in a similar manner to support layer 220 described above with respect to FIGS. 3A-3C. The planar segment and the support layer segment may each be formed of a PSP material and collectively form PSP patch 412B. The decision to remove portions of support structures 408 within the identified damaged section 402 of dual-walled component 400 may depend in part on the depth of the damage, complexity of the shape of dual-walled component 400 within damaged section 402, ease of fabrication of PSP patch 412A or 412B, or the like.

The technique of FIG. 4 also includes preparing PSP patch 412A or 412B to replace repair volume 403A or 403B (302). In some examples, repair volume 403A or 403B of dual-walled component 400 may be set to a pre-defined shape or template such as, but not limited to, rectangular, circular, oval, or the like. In such examples, the corresponding repair PSP patch 412A or 412B may be nominally sized and shaped to provide a mating fit with the repair volume 403A or 403B. In other examples, the shape and size of repair volume 403A or 403B of dual-walled component 400 may be determined based on the size and shape of damaged portion 402. The corresponding repair PSP patch 412A or 412B used in such repairs may be custom made or may be nominally sized and subsequently custom fitted to a mating fix with repair volume 403A or 403B. In all cases, PSP patch 412A or 412B may be formed of a PSP material including a high-melt metal alloy and a low-melt braze material as described above.

The technique of FIG. 4 also includes applying PSP patch 412A or 412B to dual-walled component 400 (304). PSP patch 412A or 412B may be applied within repair volume 403A or 403B. PSP patch 412A or 412B may be sized to provide a close fit within repair volume 403A or 403B. In some examples, PSP patch 412A or 412B may be press fitted into repair volume 403A or 403B. Additionally, or alternatively, PSP patch 412A or 412B may include a layer of temporary adhesive along one or more of the surfaces of PSP patch 412A or 412B to be positioned in contact with dual walled component 400. As described above, the temporary adhesive may help secure PSP patch 412A or 412B in place relative to dual-walled component 400 for the subsequent heating process (306). During the heating process (306) to bond PSP patch 412A or 412B to dual-walled component 400, the temporary adhesive may be removed by, for example, thermal degradation and not form part of the bond formed between PSP patch 412A or 412B and dual-walled component 400.

Once PSP patch 412A or 412B is applied to dual-walled component 400, PSP patch 412A or 412B may be heated to complete the sintering process and bond PSP patch 412A or 412B to dual-walled component 400 (306). In some examples, PSP patch 412A or 412B may be heated to a temperature above the softening or melting point of the low-melt braze material and below the melting point of the high-melt metal alloy contained within PSP patch 412A or 412B. The low-melt braze material may diffuse into the high-melt metal alloy of PSP patch 412A or 412B and into adjacent portions of dual-walled component 400 to bond the two structures together and convert the PSP patch into a fully sintered metal alloy (e.g., superalloy).

PSP patch 412A or 412B may be heated using any suitable technique or device including for example, a flame torch, laser, furnace, autoclave, or the like. Example techniques and apparatuses used for performing bonding of dual-walled components which may be used or adapted for used of bonding PSP patch 412A or 412B to dual-walled component are described in U.S. patent application Ser. No. 15/184,235 filed Jun. 16, 2016 entitled AUTOMATED COATING APPLICATION, and U.S. patent application Ser. No. 14/727,593 filed Jun. 1, 2015 entitled FIXTURE FOR HIGH TEMPERATURE JOINING, both of which are incorporated by reference in their entirety.

In some examples, cooling apertures 430 may be introduced into PSP patch 412A or 412B either prior to or after bonding PSP patch 412A or 412B to dual-walled component 400. The cooling apertures 430 may replace those apertures originally present within damaged area 402 and removed as part of repair volume 403A or 403B. Cooling apertures 430 may be formed using any suitable technique including, for example, mechanical drilling, laser ablation (e.g., picosecond or femtosecond pulsed lasers), electro-chemical machining, or the like.

In some examples one or more exterior layers or coatings (not shown) may be applied to the exterior surface of PSP patch 412A or 412A after being bonded to dual-walled component 400. Example layers or coatings may include, for example, bond coats, thermal barrier coatings, environmental barrier coatings, CMAS-resistant coatings, or the like. Such layers or coatings may be applied PSP patch 412A or 412B or hot section part 406 at any suitable point in the process of repairing dual-walled component 400.

Various examples have been described. These and other examples are within the scope of the following claims.

What is claimed is:

1. A method for forming a dual-walled component for a gas turbine engine, the method comprising:
forming a cold section part comprising an outer surface that defines a plurality of impingement apertures;
forming a hot section part comprising a pre-sintered preform, wherein the pre-sintered preform comprises a plurality of support structures, and wherein the pre-sintered preform includes a partially sintered mixture of high-melt metal alloy particles and low-melt braze material particles;
positioning the hot section part over the outer surface of the cold section part such that the plurality of support structures separate the hot section part from the cold section part to define at least one cooling channel therebetween; and
heating an entire assembly of the cold section part, the hot section part, and the plurality of support structures to achieve a temperature of the pre-sintered preform above a melting point of the low-melt braze material particles and below a melting point of the high-melt metal alloy particles to sinter the pre-sintered preform and bond the hot section part to the cold section part via the plurality of support structures.

2. The method of claim 1, further comprising integrally casting the plurality of support structures on an inner surface of the hot section part.

3. The method of claim 1, further comprising etching or machining an inner surface of the hot section part to form the plurality of support structures.

4. The method of claim 1, further comprising forming a layer comprising the pre-sintered preform and etching or machining a surface of the layer to define the plurality of support structures.

5. The method of claim 1, further comprising:
   prior to positioning the hot section part over the outer surface of the cold section part, depositing an adhesive on a least one surface of at least one support structure of the plurality of support structures; and
   using the adhesive, adhering the at least one support structure to the cold section part or the hot section part.

6. The method of claim 1, wherein the dual-walled component comprises a flame tube, a combustion ring, a combustor casing, a combustor guide vane, a turbine vane, a turbine disc, or a turbine blade.

7. The method of claim 1, wherein the pre-sintered preform comprises a homogenous mixture of the high-melt metal alloy particles and the low-melt braze material particles.

* * * * *